No. 845,340. PATENTED FEB. 26, 1907.
C. E. DREW.
KNIFE SHANK.
APPLICATION FILED SEPT. 26, 1906.
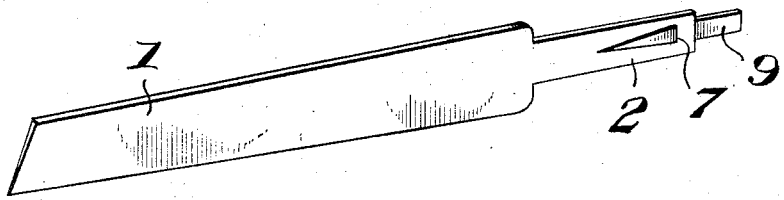
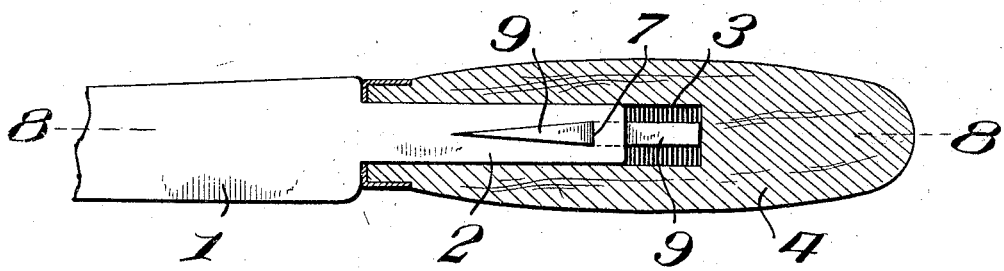
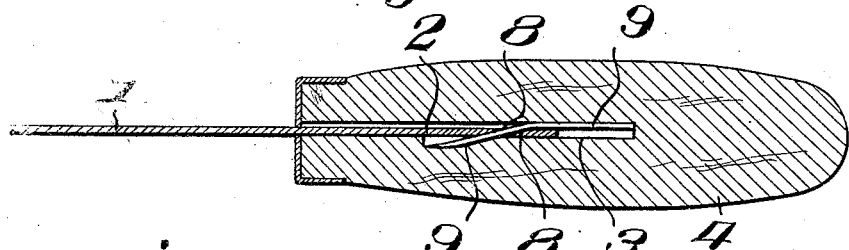
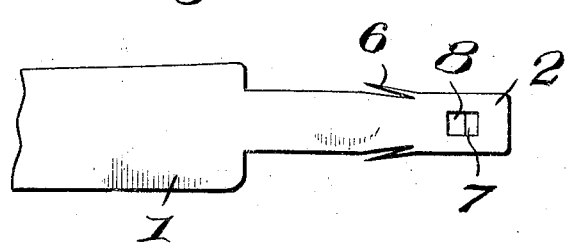
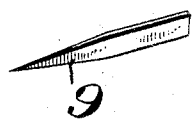
Inventor
C. E. Drew
Witnesses

UNITED STATES PATENT OFFICE.

CHARLES E. DREW, OF FARMINGTON, NEW HAMPSHIRE.

KNIFE-SHANK.

No. 845,340.

Specification of Letters Patent.

Patented Feb. 26, 1907.

Application filed September 26, 1906. Serial No. 336,359.

*To all whom it may concern:*

Be it known that I, CHARLES E. DREW, a citizen of the United States, residing at Farmington, in the county of Strafford and State of New Hampshire, have invented certain new and useful Improvements in Knife-Shanks; and I do hereby declare the following to be a full, clear, and exact description of the invention, such as will enable others skilled in the art to which it appertains to make and use the same.

My invention relates to new and useful improvements in knife-shanks; and my object is to provide means for securing the shank of the knife within a handle.

Other objects and advantages will be hereinafter referred to, and more particularly pointed out in the claims.

In the accompanying drawings, which are made a part of this application, Figure 1 is a perspective view of a knife-blade and showing my improved form of spur and shank. Fig. 2 is a sectional view thereof, showing the same secured in a handle. Fig. 3 is a sectional view as seen from line 8 8, Fig. 2. Fig. 4 is a side elevation of the blade, showing a slightly-modified form of shank; and Fig. 5 is a perspective view of the spur.

Referring to the drawings, in which similar reference-numerals designate corresponding parts throughout the several views, 1 indicates a knife-blade, which may be of the usual or any preferred form, and preferably of that class known as "shoe-knives," but may be readily used in connection with any form of table-knife or the like, said blade having a shank 2 at one end thereof, which is adapted to enter a socket 3 in the usual or any preferred form of handle 4. The handle 4 is constructed of any preferred fibrous material, such as wood or the like, and the shank 2 is provided with upwardly and downwardly extending teeth 6, which are formed by cutting into the edges of the shank and directing the severed portions outwardly, so that when the shank is driven into the socket the teeth 6 will readily enter the adjacent portions of the handle and aid in holding the shank within the socket.

The free end of the shank is provided with an opening 7, the two ends of which are beveled, as shown at 8, and the spur 9 is made in a separate piece and adapted to be disposed through the opening 7, as best shown in Fig. 3 of the drawings. In this construction it will be seen that when the shank is driven into the handle that a portion of the spur 9 will extend through the shank and be directed into the adjacent portion of the handle, so that when the shank is properly disposed within the handle the spur will prevent the shank from being withdrawn from the handle.

It will now be seen that I have provided a cheap and convenient construction for securely holding the shank of the knife-blade within its respective handle and one that can be readily constructed and positive in its operation.

What I claim is—

1. The combination with a handle having a socket therein; of a blade, a shank at one end of said blade adapted to be disposed in said socket, an oblong spur having its inner end in engagement with the end of the socket, while the opposite end thereof is pointed and directed through an opening in said shank and into engagement with the adjacent portion of the handle whereby the shank will be held in the handle.

2. The combination with a handle having a socket therein; of a blade, a shank at one end of said blade having an opening therein, the material at the ends of said opening being tapered, and an oblong spur disposed through said opening, one end of said spur engaging the end of the socket, while the opposite end thereof is pointed and seated in the adjacent portion of the handle when the shank is forced into the socket.

3. The combination with a handle having a socket therein; of a blade, a shank at one end of said blade of less length than said socket and having an opening therein, a spur having one of its ends pointed and its opposite end flat adapted to extend through said opening the flat end thereof seated on the end of the socket while the pointed end thereof is directed into the adjacent portion of the handle, and teeth on the upper and lower edges of the shank.

In testimony whereof I have signed my name to this specification in the presence of two subscribing witnesses.

CHARLES E. DREW.

Witnesses:
ALBERT GARLAND,
FRANKLIN W. COBURN, Jr.